(12) United States Patent
Hauser et al.

(10) Patent No.: US 6,935,454 B1
(45) Date of Patent: Aug. 30, 2005

(54) VALVE FOR A HYDRAULIC DRIVE APPARATUS

(75) Inventors: Raymond Hauser, Sullivan, IL (US); William H. Ward, Mahomet, IL (US)

(73) Assignee: Hydro-Gear Limited Partnership, Sullivan, IL (US)

( * ) Notice: Subject to any disclaimer, the term of this patent is extended or adjusted under 35 U.S.C. 154(b) by 0 days.

(21) Appl. No.: 10/664,633

(22) Filed: Sep. 18, 2003

(51) Int. Cl.[7] ............................................. B60K 17/356
(52) U.S. Cl. ...................................... 180/242; 180/305
(58) Field of Search ............................... 180/6.2, 6.48, 180/305–308, 242–245; 60/421, 422, 484, 60/486, 487

(56) References Cited

U.S. PATENT DOCUMENTS

| | | | |
|---|---|---|---|
| 3,126,707 A | 3/1964 | Hann et al. | |
| 3,522,999 A | 8/1970 | Liles | |
| 4,494,624 A | 1/1985 | Scheuerle et al. | |
| 4,915,126 A | 4/1990 | Gyllinder | |
| 4,948,092 A | 8/1990 | Kasper et al. | |
| 5,282,363 A | 2/1994 | Ogawa et al. | |
| 5,333,451 A | 8/1994 | Sakikawa et al. | |
| 5,412,948 A | 5/1995 | Komura et al. | |
| 5,542,384 A | 8/1996 | Rosenmann et al. | |
| 5,546,752 A | 8/1996 | Horton et al. | |
| 5,632,467 A | 5/1997 | Just et al. | |
| 5,687,468 A | 11/1997 | Hans | |
| 5,850,886 A * | 12/1998 | Kouno et al. | 180/6.24 |
| 5,957,229 A * | 9/1999 | Ishii | 180/6.48 |
| 6,045,116 A | 4/2000 | Wilke et al. | |
| 6,056,074 A | 5/2000 | Heal et al. | |
| 6,073,444 A | 6/2000 | Horton et al. | |
| 6,079,957 A | 6/2000 | Jirele | |
| 6,196,348 B1 * | 3/2001 | Yano et al. | 180/242 |
| 6,209,675 B1 * | 4/2001 | Hayashi et al. | 180/307 |
| 6,295,811 B1 | 10/2001 | Mangano et al. | |
| 6,397,966 B1 * | 6/2002 | Irikura et al. | 180/307 |
| 6,401,854 B2 * | 6/2002 | Yano et al. | 180/242 |
| 6,457,546 B1 * | 10/2002 | Ishimaru et al. | 180/305 |
| 6,722,464 B2 * | 4/2004 | Nakatani et al. | 180/305 |
| 6,749,037 B2 * | 6/2004 | Lindholdt | 180/242 |

OTHER PUBLICATIONS

Circle Seals Controls, Inc., "100 Series Check Valves 0 to 25 PSIG," brochure, Circle Seals Controls, Inc. (Corona, California), p. 1-2.

Circle Seal Controls, Inc., "200 Series 0 to 3,000 PSIG H200 Series 0 to 6,000 PSIG Check Valves," brochure.

(Continued)

*Primary Examiner*—Lesley D. Morris
*Assistant Examiner*—L. Lum
(74) *Attorney, Agent, or Firm*—Neal, Gerber & Eisenberg LLP

(57) ABSTRACT

An improved valve for use in a hydrostatic drive apparatus for a vehicle such as a zero turn vehicle. For each hydraulic drive system in the vehicle, a valve is located between the high and low pressure sides of the closed hydraulic circuit connecting the hydraulic pump and motor. The valve opens when the pressure rise rate in the high pressure side reaches a set level to minimize pressure spikes in the high pressure side and thus improve performance of the vehicle. A valve block may be used to mount the valve, and a second valve may also be included therein to connect the two pressure sides of the hydraulic circuit in a similar manner when the vehicle is operated in reverse.

10 Claims, 6 Drawing Sheets

OTHER PUBLICATIONS

The Lee Company, "Lee Cheks," web site information brochure, (Mar. 15, 2002).

The Lee Company, "Lee Pressure Relief Valves How to select the right Relief Valve for your application," Article, (Mar. 15, 2002).

Kepner Products Company, "Check Valves," web stie product information, (Mar. 15, 2002).

Kepner Products Company, "Relief Valves," web site information, Kepner Products Company.

* cited by examiner

VALVE FOR A HYDRAULIC DRIVE APPARATUS

BACKGROUND OF THE INVENTION

This invention relates generally to valves, and more particularly, to a valve used in hydraulic pumps and motors to improve the performance thereof. Some hydraulic drive systems such as those used in vehicles are very efficient and such efficiency can cause design and operation problems. For example, the hydraulic drive system may be efficient to the point where the vehicle jerks as it begins to move, and such motion may cause the front end of the vehicle to briefly leave the ground. Such jerks are undesirable as they can cause operator discomfort and may also cause undesirable pressure shocks within the components of the drive system that can affect the life of its components. A variety of techniques are used to reduce the effects of that efficiency, such as use of bleeds or kidney configurations. However, these techniques create problems of their own, such as loss of efficiency at higher load levels.

SUMMARY OF THE INVENTION

A valve configuration for slowing the pressure rise rate of a hydraulic drive system during initial acceleration is disclosed herein. The disclosed valve configuration resolves the above difficulties and adds flexibility to the placement of valves for a slow pressure rise rate. The use of such valves in a zero turn vehicle to improve performance of a pair of drive systems is also disclosed herein.

Other benefits and objects of this invention are disclosed herein and will be obvious to readers of ordinary skill in the art. The features disclosed herein can be combined to create a unique design; it should be understood, however, that such features are unique in their own right and can be used independently with other transmission, transaxle or vehicle designs, as will be obvious to one of ordinary skill in the art.

DETAILED DESCRIPTION OF THE DRAWINGS

Figure 1:
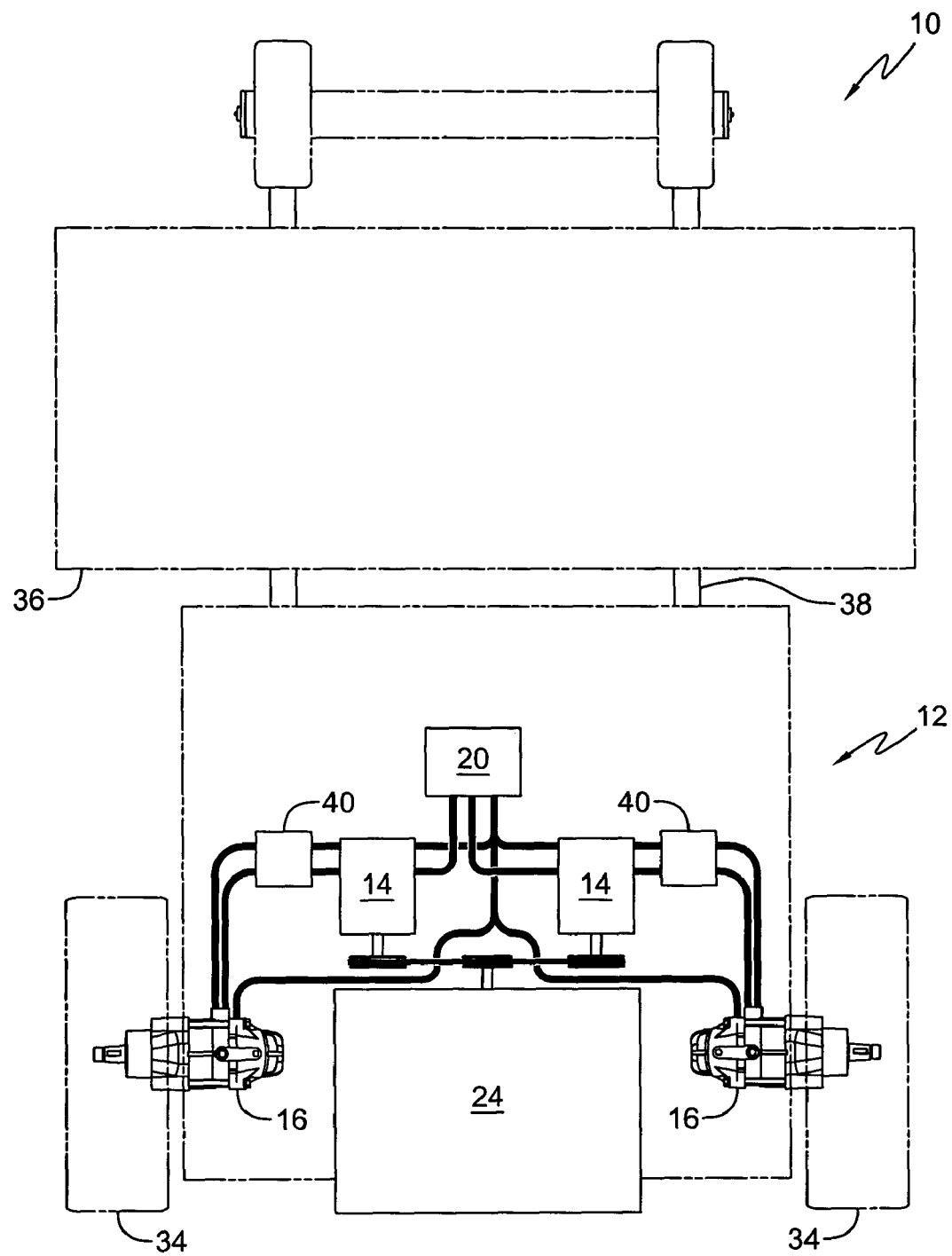
FIG. 1 depicts a plan view of an exemplary vehicle with a hydraulic drive system incorporating the invention.
Figure 2:
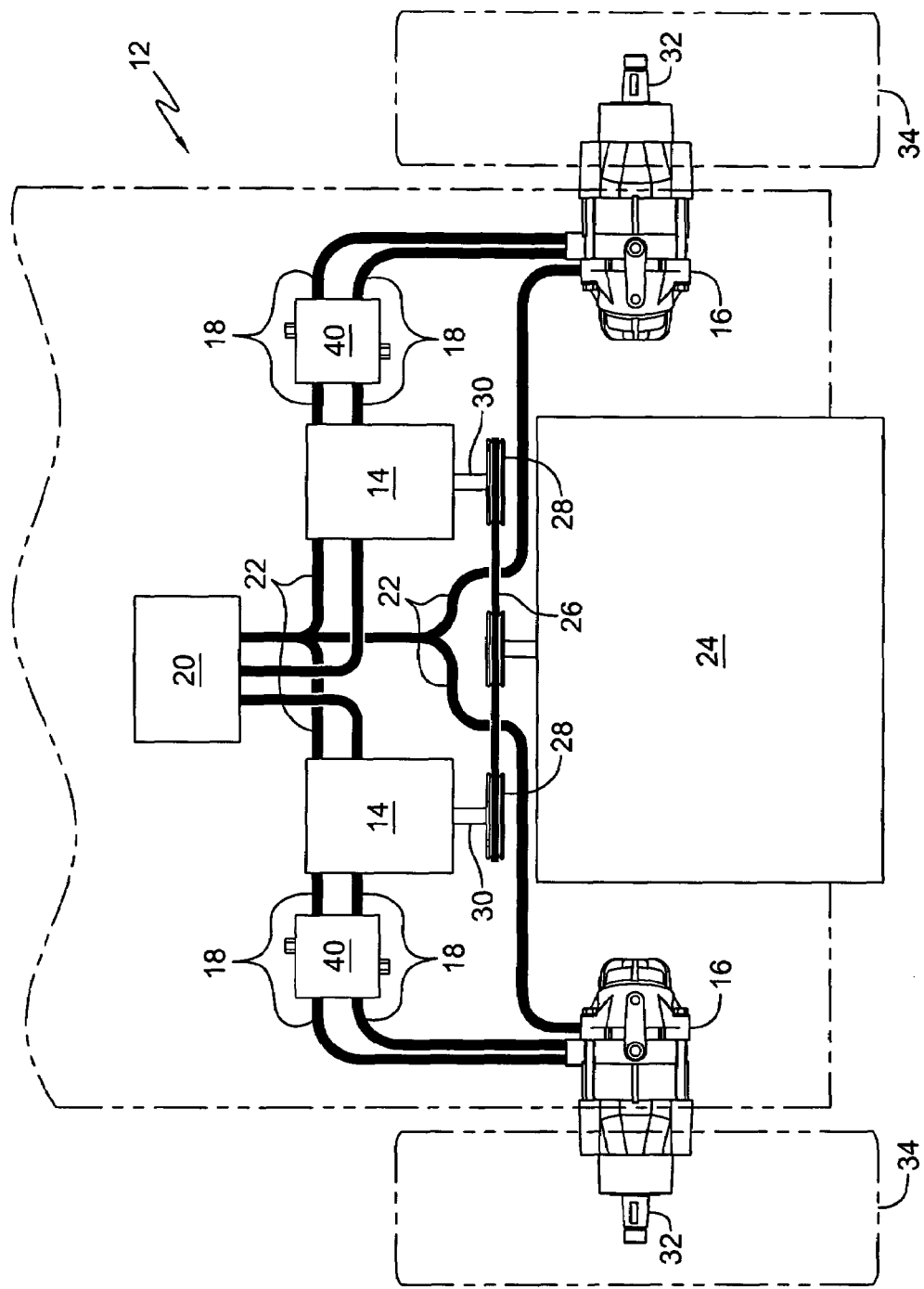
FIG. 2 is a partially schematic plan view of a portion of the vehicle shown in FIG. 1.

Turning now to the figures, wherein like reference numerals refer to like elements, there is generally illustrated in FIGS. 1 and 2 a vehicle 10 with a hydraulic drive system 12. Drive system 12 comprises a pair of hydraulic pumps 14, which are hydraulically linked to respective hydraulic wheel motors 16 by means of hydraulic lines 18. Pumps 14 obtain hydraulic fluid from a reservoir 20. Pumps 14 and motors 16 may have return lines 22 to return excess hydraulic fluid to reservoir 20 for cooling and filtration prior to being reintroduced to pumps 14.

Pumps 14 are driven by prime mover 24, which may be directly connected to pumps 14 or may be connected via one or more belts 26. Belt 26 is connected to pumps 14 by means of input pulleys 28, which are further connected to input shafts 30, which then drive hydraulic pumps 14. Wheel motors 16 drive output shafts 32, which may also function as axle shafts 32 that then drive wheels 34.

Vehicle 10 may be a variety of configurations such as a zero turn mower or the like, and vehicle 10 may include features such as mowing deck 36 mounted on frame 38. In order to steer such a vehicle, the amount of hydraulic fluid flowing between pumps 14 and motors 16 is independently adjusted to cause one side of vehicle 10 to move faster or slower. The relative speed difference between the right pump 14 and motor 16 and the left pump 14 and motor 16 causes vehicle 10 to be steered. The ability to move the two drive units in opposite directions at the same time provides the unit zero turn capability.

Figure 4:
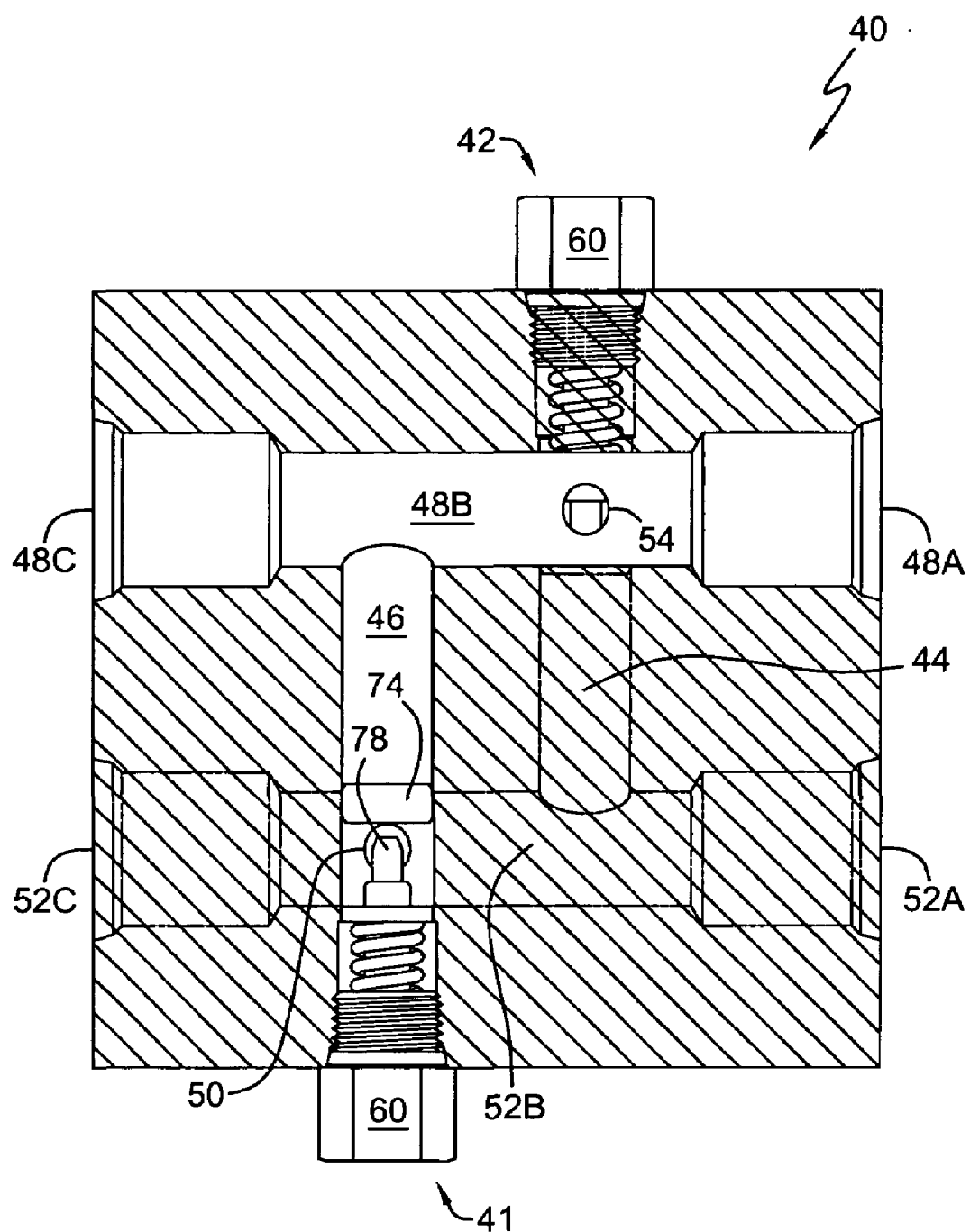
FIG. 4 is a cross-sectional plan view of the valve block shown in FIG. 3 along the lines 4—4.

In order to reduce the efficiency of drive system 12 at initial acceleration, while providing maximum efficiency during travel, a pair of valve blocks 40 are provided. As shown most clearly in FIG. 4, valve block 40 comprises two valves 41 and 42 mounted therein in ports 46 and 44, respectively. In FIG. 4, valve 41 is shown in the open position while valve 42 is shown in the closed position.

Ports 48A and 52A are both connected to pump 14 through hydraulic lines 18. Fluid pressure into port 48A from pump 14 corresponds to fluid flow in the forward direction, while fluid pressure into port 52A corresponds to fluid flow in the reverse direction.

Port 48A connects to port passage 48B, which then connects to port 48C. Additional hydraulic lines 18 are connected to port 48C to connect block 40 to a motor 16. Similarly, port 52A connects to passage 52B, which then connects to port 52C, and then by way of hydraulic lines 18 to motor 16. The hydraulic lines 18 and return lines 22 are all preferably standard rubber hoses or hard plumbing of a type sufficient to withstand the pressures presented by the hydraulic application being used.

When port passage 48B is pressurized, such as would occur during actuation of drive system 12 in the forward direction, port passage 52B in block 40 is in a low pressure condition, which may be vacuum pressure or pressure lower than atmospheric pressure.

A first opening 50 is formed by the intersection of port 46 and passage 52B. A second opening 54 is formed by the intersection of port 44 and passage 48B. Note that openings 50 and 54 are formed by the intersection of two circular passages. There are other techniques for forming a connection between these passages that are known in the art, such as a separate machining to form these openings or casting an interconnecting passage that may open external to valve block 40 and require a separate plug to close the external opening.

Port 46 is formed in block 40 such that it intersects with passage 48B, and a first valve 41 is installed in port 46. Under certain pressure conditions, valve 41 will open such that hydraulic fluid will flow from port passage 48B into port 46, where it will flow into port passage 52B by way of opening 50. The pressure differential between port passage 48B and port passage 52B will cause hydraulic fluid to flow readily from passage 48B to passage 52B when valve 41 is open.

When passage 52B is under high pressure, passage 48B is at a lower pressure, which may be a vacuum pressure or a pressure lower than atmospheric pressure. Valve 42 is positioned in port 44, which intersects port passage 52B. As in the other direction, when valve 42 opens, fluid will flow from port 44 to passage 48B by way of opening 54.

Figure 3:
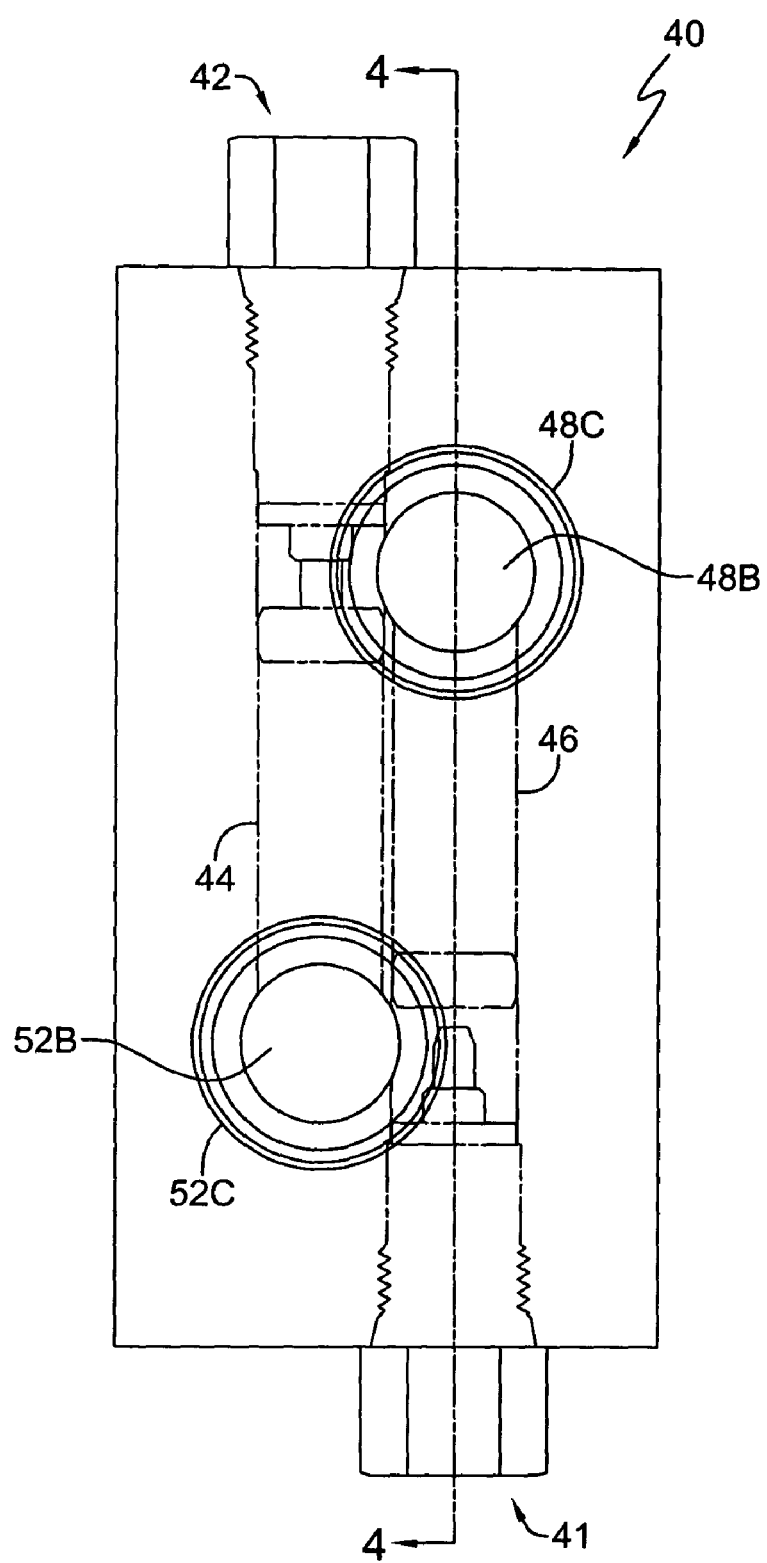
FIG. 3 is a side elevational view of the valve block shown in accordance with an advantageous embodiment of this invention.

As is evident from FIGS. 3 and 4 and from the above description, ports 48A, 48C and 46, passage 48B, and valve 41 have central axes that are generally in a first plane. Ports 52A, 52C and 44, passage 52B and valve 42 have central axes that are generally in a second plane that is different from, though preferably parallel to, the first plane. Such planar separation is required so that flow through passages 48B and 52B is generally unimpeded. As noted previously, while the planes in which these features are located are separated, certain passages are located such that they intersect so as to form connecting passages 50 and 54.

Figure 5:
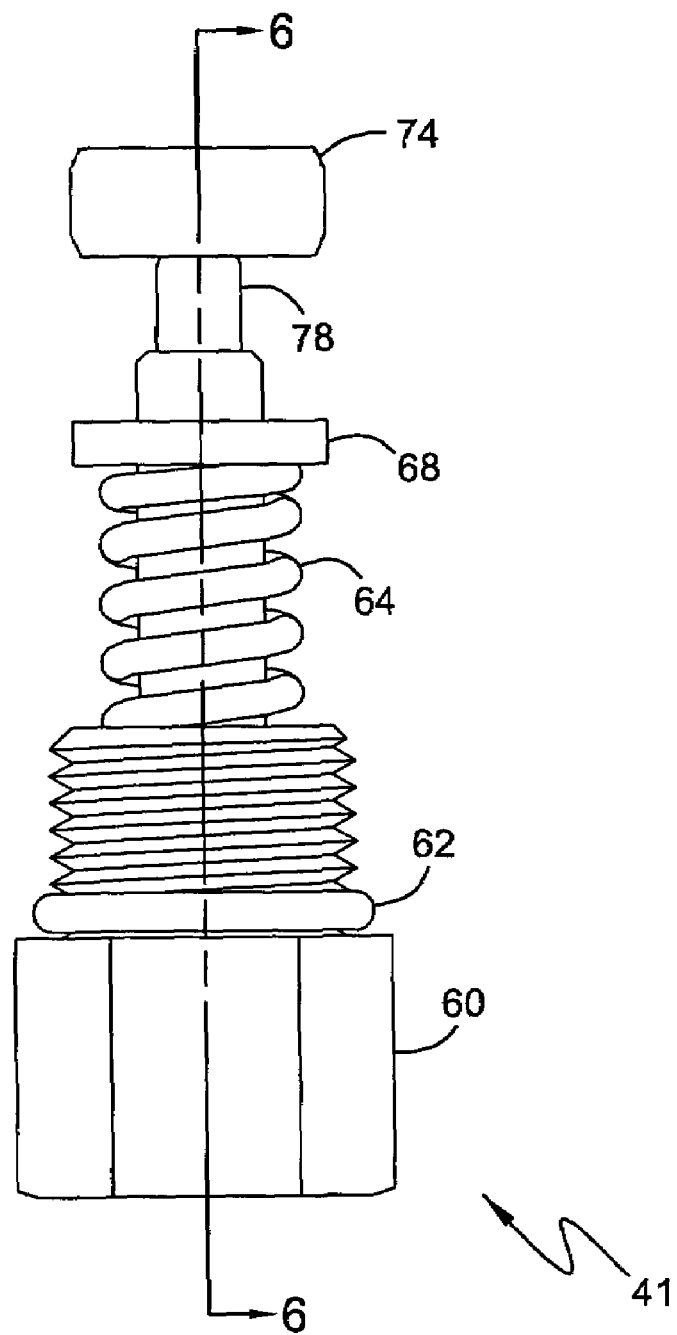
FIG. 5 is an elevational view of one of the valves and the valve seat as shown in FIG. 4.
Figure 6:
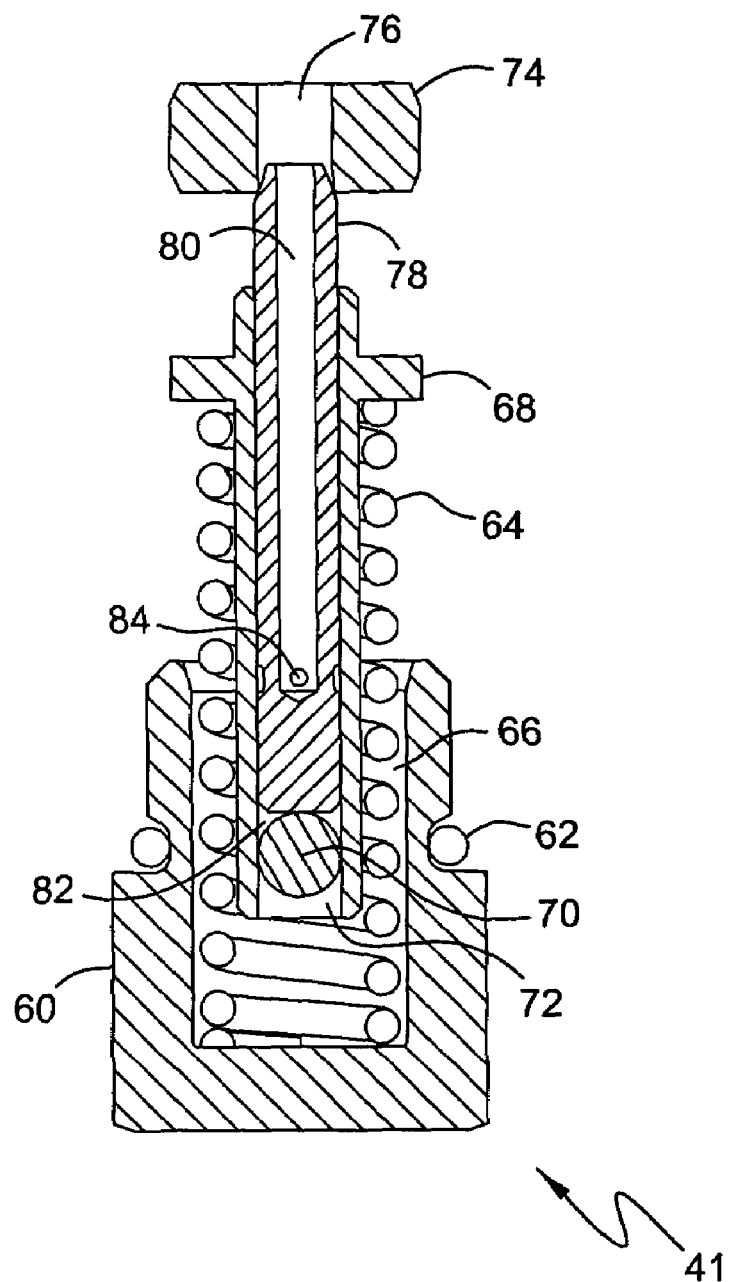
FIG. 6 is a cross-sectional view of the valve and valve seat along lines 6—6 in FIG. 5.

Valve 41, which is preferably identical to valve 42, is shown in more detail in FIGS. 5 and 6, and comprises a valve body 60 which is secured in port 46. O-ring 62 prevents leakage of oil from the interface between valve 41 and block 40. Spring 64 is mounted in bore 66 of valve body 60, and engages outer plunger cylinder 68. A center piston 78, which has an inner bore 80, is mounted in inner bore 72 of outer cylinder 68. Ball 70 is pressed into inner bore 72 at one end thereof.

A separate seat 74, which is also depicted in FIGS. 4 and 5, is pressed into hydraulic port 46 to a measured depth, or to a stop formed therein, and includes an opening 76 formed therein. Seat 74 could also be integrally formed with block 40. Ball 70 could be replaced by other shapes or a functionally equivalent feature could be integrally formed in outer cylinder 68.

Valve 41 is shown in the closed position in FIGS. 5 and 6. As the oil pressure outside seat 74 increases, oil will flow through seat opening 76 into bore 80 of piston 78. The force of piston 78 against ball 70 will move cylinder 68 in a direction away from seat 74, thus compressing spring 64 and opening valve 41 to permit high pressure oil to pass into opening 50 as previously described. Oil will also pass through bleed orifice 84 to the area 82 adjacent to ball 70 inside bore 72. As the oil pressure in area 82 increases, it increases pressure on piston 78, forcing piston 78 to move axially away from ball 70 to the point where it again engages seat 74 and closes valve 41.

The rate at which valve 41 opens and closes may be set by design choices such as the spring constant of spring 64 and the diameters of inner bore 80 and bleed orifice 84. Therefore, when the pressure in passage 48B is sufficiently high, such as at engagement of the drive system and initial vehicle movement when the pressure would spike, valve 41 acts to relieve or dampen this pressure spike and improve the ride and performance of the vehicle. Similarly, valve 42 acts in the same manner when pump 14 is put into reverse to dampen any pressure spike in port passage 52B. In the embodiment shown in FIG. 2, both blocks 40 would operate in the same manner to provide damping for both pumps 14.

In some vehicle designs, only the forward or reverse direction may need the pressure rise rate controlled; in such a case either valve port 44 or valve port 46 may be eliminated and valve block 40 would include only a single valve.

While specific embodiments of the invention have been described in detail, it will be appreciated by those skilled in the art that various modifications and alternatives to those details could be developed in light of the overall teachings of the disclosure. Accordingly, the particular arrangement disclosed is meant to be illustrative only and not limiting as to the scope of the invention which is to be given the full breadth of the appended claims and any equivalents thereof.

What is claimed is:

1. A zero turn vehicle comprising:
   a first drive system comprising a first hydraulic pump and a first hydraulic motor, where the first hydraulic pump is connected to the first hydraulic motor through a closed hydraulic loop having a high pressure side and a low pressure side;
   a first output axle driven by the first hydraulic motor and connected to one wheel of the vehicle;
   a second drive system comprising a second hydraulic pump and a second hydraulic motor, where the first hydraulic pump is connected to the first hydraulic motor through a closed hydraulic loop having a high pressure side and a low pressure side;
   a second output axle driven by the second hydraulic motor and connected to a second wheel of the vehicle;
   a first valve located between the high pressure side and low pressure side of the first closed hydraulic loop to reduce a pressure rise rate when the first hydraulic pump is engaged; and
   a second valve located between the high pressure side and low pressure side of the second closed hydraulic loop to reduce a pressure rise rate when the second hydraulic pump is engaged.

2. A zero turn vehicle as set forth in claim 1, further comprising a first valve block in which the first valve is located and a second valve block in which the second valve is located, wherein the first and second valve blocks are mounted in the vehicle separate from the first and second hydraulic pumps.

3. A zero turn vehicle as set forth in claim 2, further comprising a first set of hydraulic lines connecting the first valve block to the first hydraulic pump and first hydraulic motor and a second set of hydraulic lines connecting the second valve block to the second hydraulic pump and second hydraulic motor.

4. A zero turn vehicle as set forth in claim 2, wherein each hydraulic pump and each hydraulic motor is mounted in a separate casing.

5. A zero turn vehicle comprising first and second drive systems mounted in the vehicle so that each drive system independently operates one of the wheels of the vehicle, each drive system comprising a hydraulic pump driving a hydraulic motor through a set of hydraulic lines and a valve block connected to the set of hydraulic lines, wherein each valve block comprises at least one pressure rise rate valve such that hydraulic fluid flowing through the valve moves from a high pressure side of the hydraulic lines to a low pressure side when the pressure rise rate in the high pressure side exceeds a set level.

6. A zero turn vehicle as set forth in claim 5, wherein each hydraulic pump and each hydraulic motor is mounted in a separate casing.

7. A zero turn vehicle comprising:
   first and second drive systems mounted in the vehicle so that each drive system independently operates one of the wheels of the vehicle;
   each drive system comprising a hydraulic pump connected to a hydraulic motor through a closed hydraulic loop having a first side and a second side and a valve block connected to the hydraulic loop between the hydraulic pump and hydraulic motor; and wherein each valve block comprises a pressure rise rate valve so that, when the first side is under pressure, hydraulic fluid will flow from the first side to the second side of the loop, when the pressure rise rate in the first side exceeds a selected level.

8. A zero turn vehicle as set forth in claim 7, wherein each valve block further comprises a second pressure rise rate valve so that, when the second side is under pressure, hydraulic fluid will flow from the second side to the first side of the loop, when the hydraulic fluid in the second side reaches a selected pressure level.

9. A zero turn vehicle as set forth in claim 8, wherein each drive system comprises a first casing for mounting the hydraulic pump therein and a second casing for mounting the hydraulic motor therein.

10. A zero turn vehicle as set forth in claim 9, wherein each drive system further comprising a first set of hydraulic lines connecting the valve block to the hydraulic pump and a second set of hydraulic lines connecting the valve block to the hydraulic motor.

* * * * *